United States Patent
Jin et al.

(10) Patent No.: US 10,069,156 B2
(45) Date of Patent: Sep. 4, 2018

(54) SEPARATION PLATE AND FUEL CELL INCLUDING THE SAME

(71) Applicants: Hyundai Motor Company, Seoul (KR); Kia Motors Corporation, Seoul (KR)

(72) Inventors: Sang Mun Jin, Gyeonggi-do (KR); Yoo Chang Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 245 days.

(21) Appl. No.: 14/922,132

(22) Filed: Oct. 24, 2015

(65) Prior Publication Data

US 2016/0164122 A1    Jun. 9, 2016

(30) Foreign Application Priority Data

Dec. 4, 2014   (KR) .......................... 10-2014-0173311

(51) Int. Cl.
| | |
|---|---|
| *H01M 8/04082* | (2016.01) |
| *H01M 8/02* | (2016.01) |
| *H01M 8/0258* | (2016.01) |
| *H01M 8/1018* | (2016.01) |
| *H01M 8/0232* | (2016.01) |
| *H01M 8/0267* | (2016.01) |

(52) U.S. Cl.
CPC ..... *H01M 8/04201* (2013.01); *H01M 8/0232* (2013.01); *H01M 8/0258* (2013.01); *H01M 8/0267* (2013.01); *H01M 2008/1095* (2013.01); *H01M 2250/20* (2013.01); *Y02T 90/32* (2013.01)

(58) Field of Classification Search
CPC .................................................. H01M 8/04201
See application file for complete search history.

(56) References Cited

U.S. PATENT DOCUMENTS

2005/0214627 A1*  9/2005  Sugita ................. H01M 8/0206
                                                    429/434

FOREIGN PATENT DOCUMENTS

| JP | H09139222 A | 5/1997 | |
| KR | 10-2013-0065171 A | 6/2013 | |
| KR | 20130065171 A * | 6/2013 | ............. H01M 8/02 |
| WO | 2012/133175 A1 | 10/2012 | |

OTHER PUBLICATIONS

Translation of KR10-2013-0065171 (Year: 2013).*
Original KR10-2013-0065171 (Year: 2013).*

* cited by examiner

*Primary Examiner* — Sarah A. Slifka
*Assistant Examiner* — Brian R Ohara
(74) *Attorney, Agent, or Firm* — Mintz Levin Cohn Ferris Glovsky and Popeo, P.C.; Peter F. Corless

(57) ABSTRACT

A fuel cell that includes a membrane-electrode assembly and separation plates disposed on both sides of the membrane-electrode assembly is provided. The fuel cell includes barrier ribs formed in reaction surfaces of the separation plates corresponding to the membrane-electrode assembly and configured to partition the reaction surfaces into a plurality of reaction regions. A micropore body is installed between the separation plate and the membrane-electrode assembly. The micropore body includes porous units disposed in the reaction region, and a connection unit integrally coupled to the porous units and flatly contacts the barrier ribs.

19 Claims, 7 Drawing Sheets

SEPARATION PLATE AND FUEL CELL INCLUDING THE SAME

CROSS-REFERENCE TO RELATED APPLICATION

This application claims priority to and the benefit of Korean Patent Application No. 10-2014-0173311 filed in the Korean Intellectual Property Office on Dec. 4, 2014, the entire contents of which are incorporated herein by reference.

BACKGROUND (a) Field of the Invention

An exemplary embodiment of the present invention relates to the fuel cell stack of a fuel cell system and more particularly, to a separation plate having a micropore body structure and a fuel cell including the same.

(b) Description of the Related Art

Generally, a fuel cell includes unit cells that generate electrical energy through an electrochemical reaction of hydrogen and oxygen. The fuel cell includes separation plates with a membrane-electrode assembly (MEA) interposed therebetween. The separation plate includes a reaction flow channel that supplies a reaction gas, including fuel and air, to a membrane-electrode assembly, and a cooling flow channel through which a coolant flows. A gas diffusion layer that diffuses the reaction gas is formed on both surfaces of the membrane-electrode assembly.

Maximization of the performance of the fuel cell, requires the interval between the reaction flow channels of the separation plates to be dense to provide a uniform surface pressure and a constant permeability across a reaction front of the gas diffusion layers and the membrane-electrode assemblies. A reduction of the interval between the reaction flow channels of the separation plates to prevent various failures occurring in a process of forming the separation plate is limited. Consequently, the following performance deteriorate factors of the fuel cell may result.

For example, a substantial interval between the reaction flow channels, causes stress to become concentrated on a land surface where the separation plate and the gas diffusion layer are positioned adjacent to each other. In particular, the compromised porous structure of the gas diffusion layer reduces the permeability of a reaction gas and the diffusion performance of a reaction gas and exhaust performance of generated water deteriorates. Furthermore, a surface of the reaction flow channel has low stress and the gas diffusion layer protrudes toward the flow channel unit of the separation plate. In other words, the viscosity of a fluid may deteriorate.

Further, the structure of the gas diffusion layer is damaged by the land unit of the separation plate since the carbon fibers penetrate the electrode layer of the membrane-electrode assembly in a broken component, thereby damaging the electrode layer. Still further, a chemical reaction is active because a reaction gas continuously supplied to the flow channel unit within the flow channel unit in which the gas diffusion layer is exposed. However, contact resistance increases due to insufficient surface pressure between the gas diffusion layer and the membrane-electrode assembly. Namely, the electrons generated by a reaction may encounter decreased mobility.

Typically, a molded porous body including porous structures that includes fine apertures and a three-dimensional porous structure that include channels is formed in a metal thin plate. Furthermore, a method of inserting a micropore structure capable of uniformly distributing surface pressure and improving the diffusion of a reaction gas and exhaust performance of generated water is used instead of the separation plate including the reaction flow channel For example, the micropore structure, includes a metal foam or wire mesh, has a high open ratio and functions as a surface pressure distribution structure to uniformly compress the gas diffusion layer. The metal foam includes many interconnected bubbles within metal materials. Additionally, the metal foam is suitable for a separation plate for a fuel cell material since the metal foam allows a fluid to pass therethrough and has a high surface area ratio per unit volume and increased strength.

However, the metal foam is limited by the entire reaction front cannot be utilized since the internal bubbles are randomly connected and thereby limits the control of a flow of the reaction gas and generated water. Furthermore, the parasitic power of the fuel cell system and the volume of the fuel cell increase since the micropore structure is applied to the separation plate, and thus a difference pressure within the separation plate increases. Furthermore, the operation safety of the fuel cell may be reduced since the micropores are frequently clogged during a supersaturate state within the fuel cell.

The above information disclosed in this section is merely for enhancement of understanding of the background of the invention and therefore it may contain information that does not form the prior art that is already known in this country to a person of ordinary skill in the art.

SUMMARY

The exemplary embodiment provides a separation plate for uniformly distributing a flow of a reaction gas while using a micropore structure, thereby increasing the utilization of a reaction gas, and improving productivity of the manufacturing of a fuel cell stack, and a fuel cell including the same.

An exemplary embodiment of the present invention provides a fuel cell, including a membrane-electrode assembly and separation plates disposed both sides of the membrane-electrode assembly. The fuel cell may include barrier ribs formed in reaction surfaces of the separation plates corresponding to the membrane-electrode assembly and configured to partition the reaction surfaces into a plurality of reaction regions, and a micropore body disposed between the separation plate and the membrane-electrode assembly. The micropore body may include porous units disposed within the reaction region and a connection unit coupled to the porous units and flatly contacts the barrier ribs.

In an exemplary embodiment of the present invention, the micropore body and the separation plates may be integrally coupled together. In the fuel cell according to an exemplary embodiment, the connection unit may be coupled to the barrier rib by laser bonding. In another exemplary embodiment of the present invention, the micropore body may be formed from a metal thin plate and may provide a molded porous body including fine apertures and a flow channel.

Additionally, the connection unit may form a flat surface that contacts with the barrier rib. The flat surface may be integrally bonded to the barrier rib through laser bonding. The barrier rib may include as a groove in a surface opposite the reaction surface and protruded toward the reaction surface. The groove may be utilized as a cooling path through which a coolant may flow. In some additional exemplary embodiments, the separation plate may include inlet and exit manifolds through which the reaction gas may be introduced and discharged, and a channel unit that may be connected to the inlet manifold and the exit manifold and may be configured to induce the reaction gas to the reaction regions.

Further, the channel unit may include channels that extend from the inlet manifold and the exit manifold to the reaction regions. The channels may have gradually increasing lengths that extend from one side of the inlet manifold and the exit manifold to the opposing side, and may be connected to the reaction regions. The channel unit may include ribs formed between the channels.

In an exemplary embodiment, the barrier rib may connect the rib and may partition the reaction surface of the separation plate into a plurality of reaction regions. In particular, the barrier rib may partition the channels into a plurality of channel groups connected to each of the reaction regions.

Separation plates for a fuel cell according to an exemplary embodiment may be disposed on opposing sides of a membrane-electrode assembly and may be configured to supply a reaction gas to the membrane-electrode assembly. Each separation plate may include barrier ribs formed within the reaction surfaces of the separation plates corresponding to the membrane-electrode assembly and may partition the reaction surfaces into a plurality of reaction regions, inlet and exit manifolds to thereby allow the reaction gas to be introduced and discharged. Further, the reaction gas may be induced to the reaction regions, and a micropore body may integrally connect the barrier ribs and may cause the reaction gas and generated water flow within the reaction regions.

In the separation plate for a fuel cell according to an exemplary embodiment, the micropore body may include porous units disposed within in the reaction regions, and a connection unit integrally connected to the porous units and flatly bonded to the barrier rib. In the separation plate for a fuel cell according to an exemplary embodiment, the micropore body may be formed from a thin metal plate and may include a molded porous body that includes fine apertures and a flow channel In addition, the connection unit may have a sustainably flat shape and may be integrally bonded to the barrier rib by laser bonding.

The channel unit may include channels that extend from the inlet manifold and the exit manifold towards the reaction regions. In the separation plate, the channels may have lengths that gradually increase from one side of the inlet manifold and the exit manifold to the opposing side, and may be connected to the reaction regions.

Further, the ribs may protrude between the channels, and the bather rib may be connected to the rib and may partition the reaction surface into a plurality of reaction regions. The barrier rib may partition the channels into a plurality of channel groups connected to each of the reaction regions. The barrier rib may form a groove in a surface opposite the reaction surface and may protrude into the reaction surface. Further, the groove may form as a cooling path through which a coolant flows.

An exemplary embodiment of the present invention may include the bather ribs that may to partition the reaction surface of the separation plate into the plurality of reaction regions. The channel unit may uniformly distribute a reaction gas to the reaction regions. The micropore bodies may be disposed within the respective reaction regions. Additionally, performance of a fuel cell stack may be significantly improved. In an exemplary embodiment of the present invention, a reaction gas may be distributed to the reaction regions through the bather ribs of the separation plate and the channel unit may continue to be uniformly distributed to the porous units of the micropore body. Furthermore, the performance of the fuel cell may be stably maintained even during an external disturbance, such as excessive inflow of condensate water.

An exemplary embodiment of the present invention may prevent a flow of a reaction gas from stagnation. For example, the porous unit of the micropore body may be formed in each of the reaction regions of the separation plate thereby causing a partial inclination of water that may be generated by a reaction of the reaction gas. An exemplary embodiment of the present invention may increase cooling efficiency of the fuel cell because the grooves may be formed in the barrier ribs and may be used as the cooling paths through which a coolant flows. An exemplary embodiment may reduce the duration of fabricating a fuel cell stack may be reduced through a reduction in the number of stacks of the fuel cell stack. In particular, the micropore body in which the porous units may correspond to the respective reaction regions may be integrally connected through the connection unit, and the connection unit may be integrally bonded to the bather ribs.

In an exemplary embodiment, improved handling may be achieved by increasing the stiffness of a micropore body shape. Additionally, the utilization of a reaction gas may be increased by reducing the interval between the porous unit of the micropore body and the barrier rib. Furthermore, the performance of a fuel cell stack may be improved, and a fuel cell stack may compactly bond the connection unit for connecting the porous units of the micropore body to the separation plate.

BRIEF DESCRIPTION OF THE DRAWINGS

The above and other features of the present disclosure will be apparent from the following detailed description taken in conjunction with the accompanying drawings.

DETAILED DESCRIPTION

Figure 1:
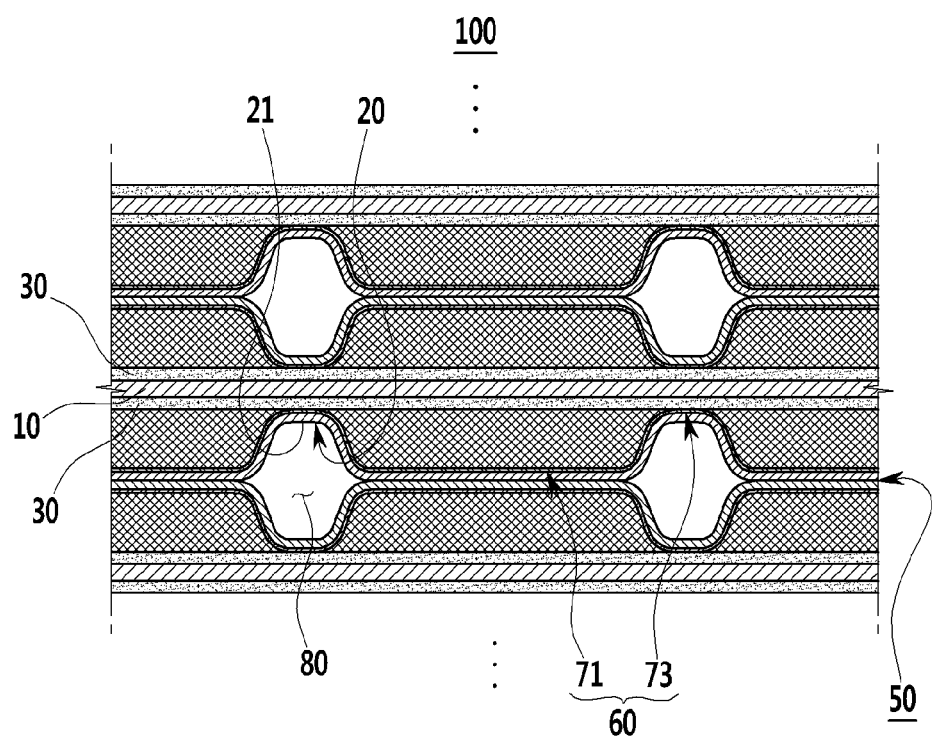
FIG. 1 is an exemplary embodiment of a cross-sectional view schematically illustrating part of a fuel cell according to an exemplary embodiment of the present invention.

Advantages and features of the invention and methods of accomplishing the same may be understood more readily by reference to the following detailed description of exemplary embodiments and the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

In order to clearly describe the present invention, a description of parts not related to the description is omitted, and the same reference numbers are used throughout the drawings to refer to the same or like parts. The size and thickness of each of elements illustrated in the drawings are arbitrarily illustrated for ease of description, and the present invention is not limited thereto. In the drawings, the thicknesses of parts and regions have been enlarged for clarity. In the following detailed description, the reason why terms, such as the first and the second, are used is to distinguish between elements because the first and the second respectively have the same constructions, and thus the elements are not limited to such order in the following description. Furthermore, each of terms such as " . . . unit," " . . . means," " . . . part," and " . . . member" described in the specification means a unit of a comprehensive element that performs at least one function or operation.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is an exemplary embodiment of a cross-sectional view schematically illustrating part of a fuel cell according to an exemplary embodiment of the present invention. Referring to FIG. 1, the fuel cell 100 according to an exemplary embodiment includes a unit cell that may be supplied with hydrogen gas, including, a fuel, and air, for example, an oxidant gas (hereinafter referred to as a "reaction gas"), and to generate electrical energy through an electrochemical reaction of hydrogen and oxygen. A plurality of sheets of the fuel cells 100 may be consecutively stacked to form a fuel cell stack. The fuel cell 100 may be configured to generate heat as a reaction byproduct and the exhaust generated water may be condensate water. For example, the fuel cell 100 may include a membrane-electrode assembly (MEA) 10, gas diffusion layers 30 disposed on opposing sides of the membrane-electrode assembly 10, and separation plates 50 proximately attached to the respective gas diffusion layers 30. The membrane-electrode assembly 10 may include an anode layer formed on one surface of an electrolyte membrane and a cathode layer formed on the opposing surface of the electrolyte membrane with the electrolyte membrane disposed between the anode layer and the cathode layer.

The anode layer may function to separate hydrogen gas, (e.g., a reaction gas), into electrons and protons through an oxidation reaction. The electrolyte membrane may transport the protons to the cathode layer. The cathode layer may be configured to generate moisture and heat through a reduction reaction of the electrons and protons that may be received from the anode layer and may be separately provided air, (e.g., a reaction gas). The gas diffusion layers 30 may diffuse a reaction gas that may be supplied through the separation plates 50 to the anode layer and cathode layer of the membrane-electrode assembly 10, and may have electrical conductivity. The gas diffusion layers 30 may be formed on the anode layer and the cathode layer.

Figure 2:
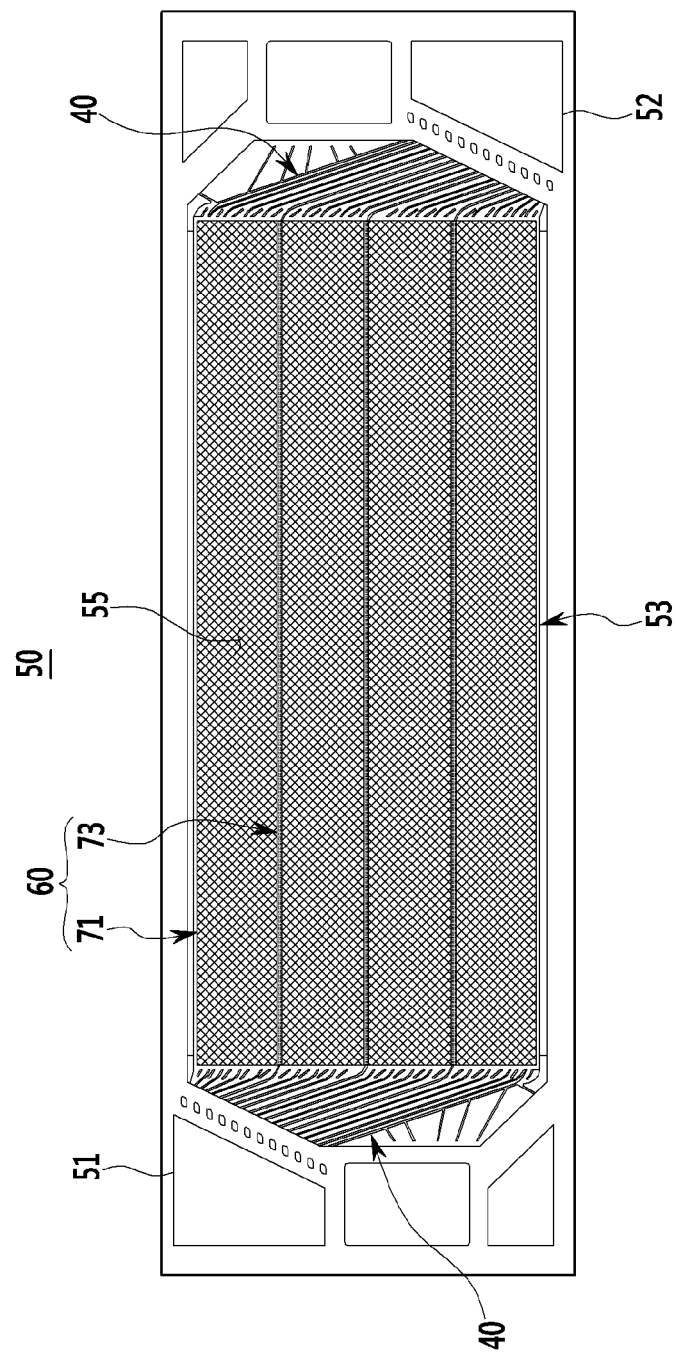
FIG. 2 is an exemplary embodiment of a schematic diagram illustrating a separation plate for a fuel cell according to an exemplary embodiment of the present invention.

The separation plates 50 may be configured to supply a reaction gas to the membrane-electrode assembly 10 through the gas diffusion layers 30, and may include materials having electrical conductivity. Each of the separation plates 50 may include an inlet manifold 51 and an exit manifold 52 that may be formed on edges on opposing sides thereof and may introduce and output a reaction gas, as illustrated in FIG. 2. Furthermore, the separation plate 50 may include a reaction surface 53 that may be connected to the inlet manifold 51 and the exit manifold 52, in other words, an area that corresponds to the gas diffusion layer 30.

The fuel cell 100 according to an exemplary embodiment may include the gas diffusion layers 30, however, the present invention is not limited thereto. An exemplary embodiment may be applied to a fuel cell 100 not including the gas diffusion layer 30. An example in which the fuel cell 100 includes the gas diffusion layers 30 is further described below. The fuel cell 100 according to an exemplary embodiment may be capable of uniformly distributing surface pressure applied to the membrane-electrode assembly 10 and may improve the diffusion of a reaction gas and the exhaust property of generated water.

Furthermore, an exemplary embodiment provides the fuel cell 100 with the capability to uniformly distribute a flow of a reaction gas and maintain stable operation even during an external disturbance, such as an instant moisture inflow attributable to excessive condensation of moisture. Furthermore, the fuel cell 100 according to an exemplary embodiment may be capable of increasing the utilization of a reaction gas and improving the productivity of the manufacturing of a fuel cell stack.

Figure 3:
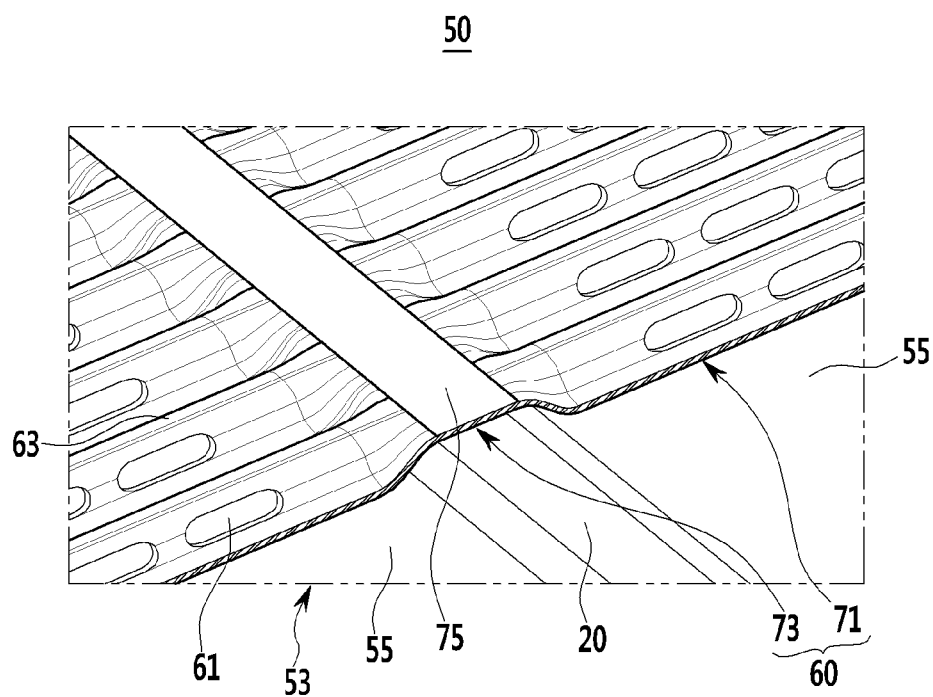
FIG. 3 is an exemplary embodiment of an enlarged view illustrating part of the separation plate for a fuel cell according to an exemplary embodiment of the present invention.
Figure 4:
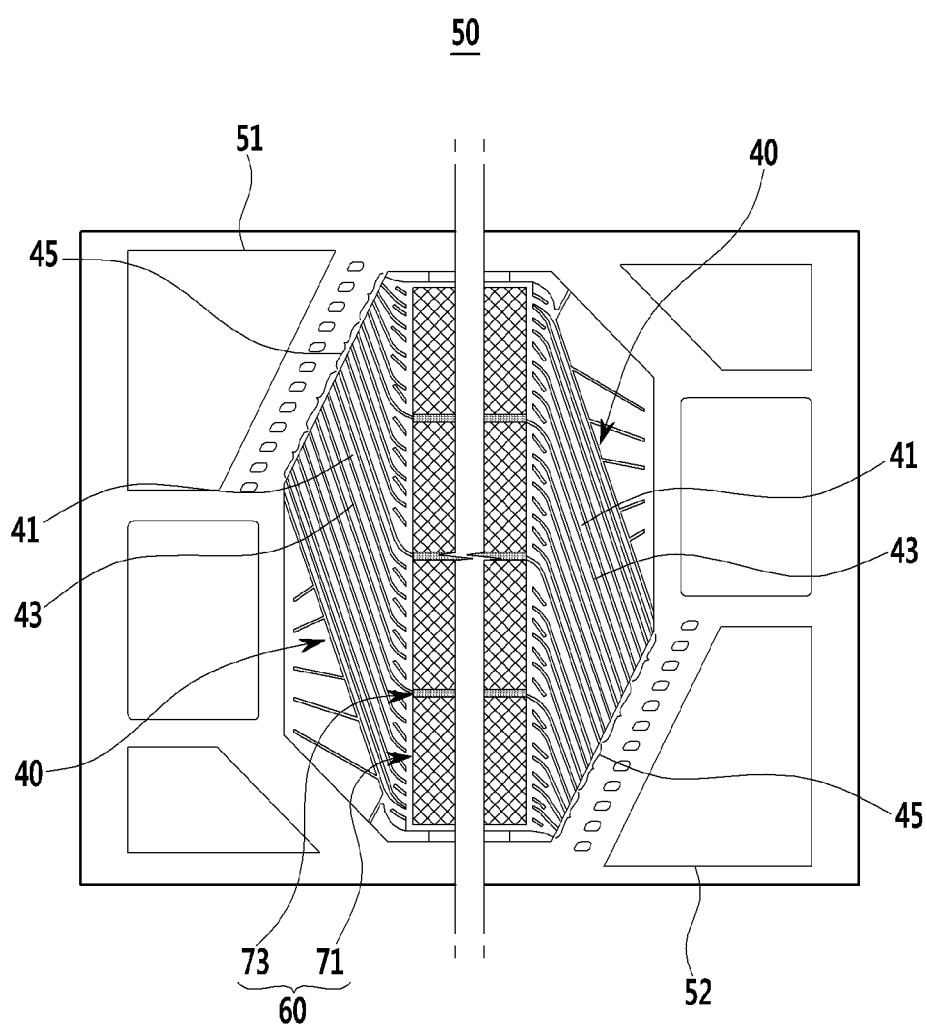
FIG. 4 is an exemplary embodiment of a diagram illustrating a channel unit applied to the separation plate for a fuel cell according to an exemplary embodiment of the present invention.

FIG. 2 is an exemplary embodiment of a plan schematic diagram illustrating the separation plate for a fuel cell according to an exemplary embodiment. FIG. 3 is an exemplary embodiment of an enlarged view illustrating a portion of the separation plate for a fuel cell according to an exemplary FIG. 4 is an exemplary embodiment of a diagram illustrating a channel unit applied to the separation plate for a fuel cell according to an exemplary.

Referring to FIGS. 1 to 4, the fuel cell 100 according to an exemplary embodiment may include barrier ribs 20 formed in the separation plates 50, a channel unit 40, and a micropore body 60 formed between the separation plate 50 and the gas diffusion layer 30. In particular, the barrier ribs 20 may be formed within the reaction surface 53 of the separation plate 50 that corresponds to the gas diffusion layer 30. The bather ribs 20 may partition the reaction surface 53 of the separation plate 50 into a plurality of reaction regions 55. The barrier rib 20 may include a groove 21 formed on the opposite surface of the reaction surface 53. The barrier rib 20 may protrude into the reaction surface 53 and may extend laterally from the inlet manifold 51 of the separation plate 50 to the exit manifold 52. In other words, the barrier ribs 20 may protrude into the reaction surface 53 of the separation plate 50 and may separate the reaction surface 53 into the plurality of reaction regions 55.

The barrier ribs 20 may form the grooves 21 on the opposite surface of the reaction surface 53 within the separation plate 50. The grooves 21 may form cooling paths 80 through which a coolant may flow when the fuel cells 100 are stacked. For example, a fuel cell stack may be formed by stacking a plurality of sheets of the fuel cells 100, the opposite surfaces of the reaction surfaces 53 of the separation plates 50 of neighboring fuel cells 100 may be attached. The cooling paths 80 may be formed when the grooves 21 on the opposite surfaces are adjacent.

In an exemplary embodiment, the channel unit 40 may function to uniformly distribute a flow of a reaction gas that may be introduced into the inlet manifold 51 to the reaction regions 55 of the reaction surface 53, and may prevent a phenomenon in which water generated by a reaction of a reaction gas is partially inclined. For example, the stagnation of the flow of the reaction gas may be attributable to the phenomenon. Furthermore, the channel unit 40 may lead a reaction gas introduced into the inlet manifold 51 to the reaction regions 55 of the reaction surface 53. Additionally, the reaction gas may be discharged passing through the reaction region 55 to the exit manifold 52. For example, the channel unit 40 may include a plurality of channels 41 which may be connected to the inlet manifold 51 and the exit manifold 52 and may also be connected to the reaction regions 55 of the reaction surface 53.

The channels 41 may be configured to extend from the inlet manifold 51 and the exit manifold 52 to the reaction regions 55 of the reaction surface 53. In particular, the channels may be formed between the inlet manifold 51 and the reaction surface 53 and between the exit manifold 52 and the reaction surface 53. For example, the channels 41 may have lengths that gradually increase from one side of the inlet manifold 51 and the exit manifold 52 to the other side, and may be connected to the reaction regions 55 of the reaction surface 53. In other words, the ribs 43 may protrude between the channels 41 and may have lengths that gradually increase from one side of the inlet manifold 51 and the exit manifold 52 to the opposite side.

In the separation plate 50, the reaction regions 55 of the reaction surface 53 may be connected to the channels 41 on a portion of the inlet manifold 51 and the exit manifold 52. The barrier ribs 20 may be connected to the ribs 43 of the channel unit 40. For example, the barrier ribs 20 may be connected to the ribs 43 of the channel unit 40 on the portion of the inlet manifold 51 and may be connected to the ribs 43 of the channel unit 40 on the portion of the exit manifold 52. The barrier ribs 20 may be connected to the ribs 43 of the channel unit 40. The barrier ribs 20 may partition the reaction surface 53 into the plurality of reaction regions 55, and may partition the channels 41 of the channel unit 40 into a plurality of channel groups 45 that may be connected to the reaction regions 55.

In an exemplary embodiment, the micropore body 60 may be configured to supply a reaction gas introduced through the inlet manifold 51 of the separation plate 50 to the membrane-electrode assembly 10 through the gas diffusion layer 30. The micropore body 60 may be disposed between the separation plate 50 and the gas diffusion layer 30. In other words, the micropore body 60 may cause a reaction gas and generated water flow in reaction regions 55 of the reaction surface 53 of the separation plate 50. The micropore body 60 may be made of metal or carbon foam and may have a predetermined open ratio (e.g., porosity). Furthermore, the micropore body 60 may be made of a wire mesh.

A molding porous body in which fine apertures 61 and flow channels 63 may be formed in a dual metal thin plate is hereinafter described as an exemplary micropore body 60. The molding porous body may have a three-dimensional micropore structure, and may be more easily fabricated thereby facilitating mass production. The micropore body 60 may have a micropore structure of an open flow field type that may be inserted into the reaction surface 53 of the separation plate 50 to increase reaction efficiency of the fuel cells 100. In particular, the micropore body 60 may be made of any one of materials including copper, gold, aluminum, tungsten, zinc metal, or a metal alloy having excellent electrical conductivity. The micropore body 60 may provide a structure that can pass a reaction gas and generated water through the micropore body. For example, the micropore body may have a high surface area ratio per unit volume and excellent strength since numerous bubbles within metal materials are connected.

Furthermore, the micropore body 60 may improve local diffusivity of a reaction gas through the micropores, may facilitate movement of the reaction gas and generated water, and may distribute surface pressure by uniformly compressing the gas diffusion layer 30. More specifically, the micropore body 60 may be integrated with the separation plate 50. For example, the micropore body 60 may be coupled to the barrier ribs 20 of the separation plate 50, and may cause a reaction gas and generated water flow within the reaction regions 55 of the reaction surface 53 of the separation plate 50.

In other words, the micropore body 60 may include porous units 71 that may be disposed in the reaction regions 55 of the reaction surface 53, and a connection unit 73 that may integrally couple to the porous units 71 and may flatly contact the bather ribs 20. The porous units 71 may have fine pores and may correspond to the gas diffusion layer 30. Furthermore, the fine pores may be disposed in the reaction regions 55 of the separation plates 50. As described above, the porous units 71 may function to make a reaction gas and may generated water flow within the reaction regions 55.

Furthermore, the connection unit 73 may integrally couple the porous units 71 disposed in the reaction regions 55. In an exemplary embodiment, the connection unit 73 may have a substantially flat shape and may be flatly bonded to the bather ribs 20. For example, the connection unit 73 may pass through the bather rib surfaces of the barrier ribs 20 between the porous units 71, and may be integrally bonded to the bather ribs 20 having a flat surface contact the barrier ribs 20. The connection unit 73 may form a flat surface 75 that may flatly contact the barrier rib surfaces of the barrier ribs 20. The flat surface 75 may be integrally bonded to the barrier rib surfaces of the barrier ribs 20 using a laser or adhesives.

Effects of the fuel cell 100 as described above according to an exemplary embodiment are described in detail below with reference to the disclosed drawings. First, in an exemplary embodiment, hydrogen gas, (e.g., a reaction gas), may be supplied to the inlet manifold 51 of the separation plate 50 on one side, and air, (e.g., a reaction gas), may be supplied to the inlet manifold 51 of the separation plate 50 on the other side.

The reaction gas may be diffused through the channels 41 of the channel unit 40, and may be distributed and induced from the reaction surface 53 of the separation plate 50 to the reaction regions 55, and may be uniformly introduced into the porous unit 71 of the micropore body 60 of the reaction regions 55. In particular, in an exemplary embodiment, the barrier ribs 20 may partition the reaction surface 53 of the separation plate 50 into the plurality of reaction regions 55. The barrier ribs 20 may partition the channels 41 of the channel unit 40 into the plurality of channel groups 45. Additionally, the reaction gas may be induced to the reaction regions 55 of the reaction surface 53 through the channel groups 45 of the channels 41 and may be uniformly introduced from the reaction regions 55 to the porous unit 71 of the micropore body 60.

Furthermore, in an exemplary embodiment, since the porous unit 71 of the micropore body 60 may be formed within the reaction regions 55, the reaction gas may flow through the micropores of the porous unit 71. For example, local diffusivity of the reaction gas may be improved, the porous unit 71 may uniformly compress the gas diffusion layer 30, and surface pressure applied to the gas diffusion layer 30 may be distributed.

The reaction gas (i.e., hydrogen gas and air) may be diffused through the gas diffusion layer 30 and may be supplied to the anode layer and cathode layer of the membrane-electrode assembly 10. The anode layer and the cathode layer may generate electrical energy by an electrochemical reaction of hydrogen and oxygen and generate water using heat and condensate water. Furthermore, the reaction gas may pass through the porous units 71 of the micropore body 60 and may be discharged to the exit manifold 52 through the channels 41 of the channel unit 40.

In another exemplary embodiment, heat generated by an electrochemical reaction of hydrogen and oxygen as described above may be cooled by a coolant that may flow through the cooling path 80 between the separation plates 50 of the fuel cells 100. The fuel cell 100 described above includes the barrier ribs 20 that partition the reaction surface 53 of the separation plate 50 into the plurality of reaction regions 55, the channel unit 40 that may uniformly distribute a reaction gas to the reaction regions 55, and the micropore body 60 that may be disposed within the reaction regions 55. Additionally, in an exemplary embodiment, a reaction gas may continue to be uniformly distributed to the porous unit 71 of the micropore body 60. The performance of the fuel cell may be stably maintained even in an external instant disturbance, such as an excessive inflow of condensate water. Further, the stagnation of a flow of a reaction gas attributable to a partial inclination of water generated by a reaction may be prevented, thereby improving the performance of a fuel cell stack.

Furthermore, in an exemplary embodiment, cooling efficiency of the fuel cell may be improved since the grooves 21 that form the bather ribs 20 may be used as the cooling paths 80 through which a coolant flows. Other effects of the fuel cell 100 may be compared with a comparative example and described herein.

Figure 5:
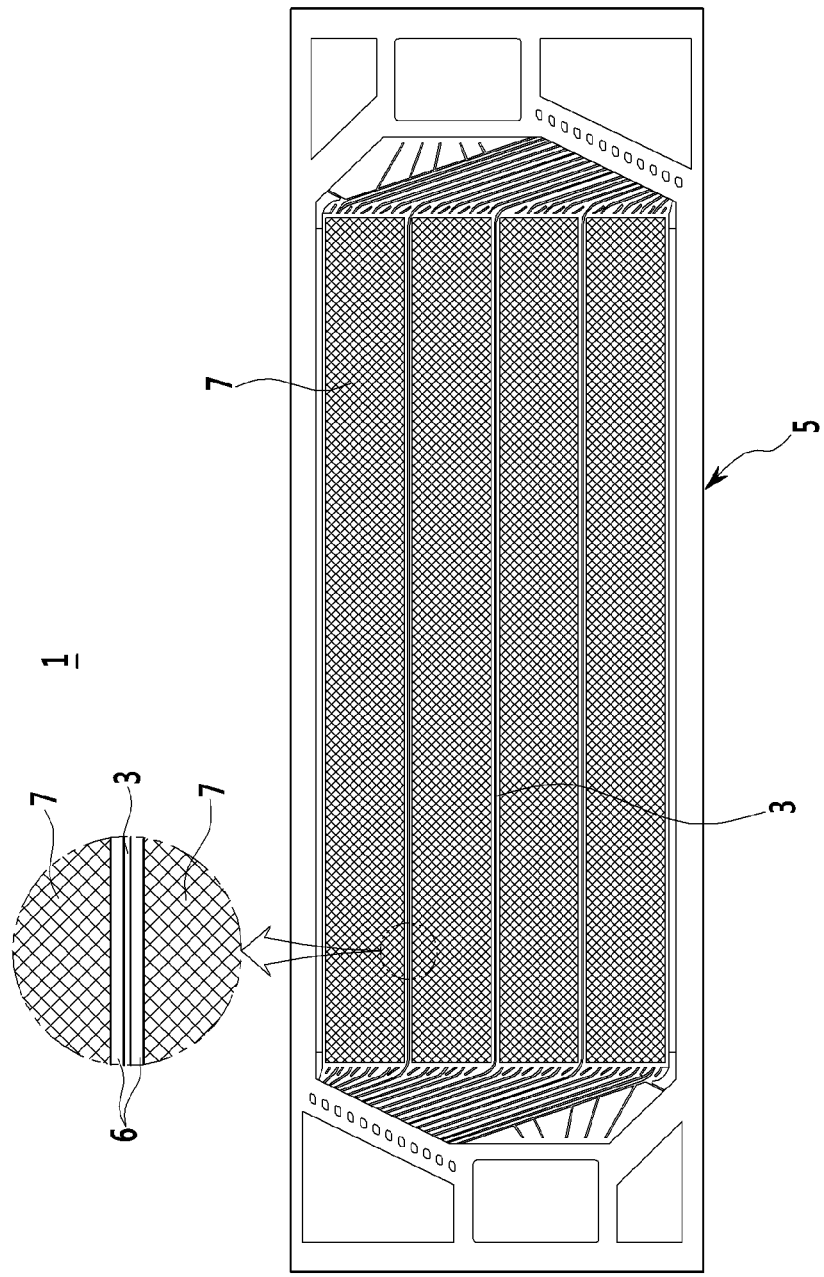
FIG. 5 is an exemplary embodiment that illustrates a comparative example for illustrating another effect of the fuel cell according to an exemplary embodiment of the present invention.

FIG. 5 is an exemplary embodiment that illustrates a comparative example for illustrating another effect of the fuel cell according to an exemplary embodiment of the present invention. Referring to FIG. 5, the fuel cell 1 of the comparative example corresponding to an exemplary embodiment may be configured to partition a reaction surface of a separation plate 5 into a plurality of reaction regions 6 through barrier ribs 3 and may install micropore bodies 7 in the reaction regions and separated from each other. In particular, in the comparative example, since the micropore bodies 7 separated from each other may be installed in the reaction regions 6 of the separation plate 5, the number of micropore bodies 7 may increase as the number of barrier ribs 3 may increase to improve the distribution of a reaction gas. As a result, in the comparative example, a plurality of the micropore bodies 7 separated from each other may be seated in the reaction regions 6 of the separation plate 5. Additionally, the fabrication of a fuel cell stack according to the stacking of several hundred fuel cells 1 vertically may become difficult.

For example, in the comparative example, assuming that the number of barrier ribs 3 is 3, the micropore bodies 7 separated from each other may be installed in the respective reaction regions 6, and thus a process for stacking the micropore bodies 7 on the fuel cell 1 of a single cell must be performed four times. Accordingly, the time required to fabricate a fuel cell stack according to the stacking of several hundred fuel cells 1 vertically may be increased. In the comparative example, since the micropore body 7 may be formed from a thin metal plate of about 0.1 t or less, it may be difficult to maintain the entire shape through the micropore body 7 itself. Furthermore, handling the micropore body 7 in a process of fabricating a fuel cell stack by stacking the fuel cells 1 may be difficult.

In the comparative example, when the micropore bodies 7 are transferred to form a fuel cell stack, stacking precision of the fuel cell stack may be deteriorated because the micropore bodies 7 may bend. In the comparative example, a bonding area where the micropore bodies 7 may be bonded to the separation plate 5 is not present since a specific flat portion is not included in the shape of the micropore bodies 7 separated from each other. Moreover, in the comparative example, there is a disadvantage in that the volume of a fuel cell stack is increased since a separate bonding area where the micropore bodies 7 are bonded to the separation plate 5 must be separately formed in the edge of the micropore bodies 7.

The fuel cell 100 according to an exemplary embodiment, may include the micropore bodies 60 each including the porous units 71 disposed in the reaction regions 55 of the separation plates 50 partitioned by the barrier ribs 20 and the connection units 73 integrally connected to the porous units 71 and flatly bonded to the barrier ribs 20. For example, in the micropore body 60, the porous units 71 may correspond to the respective reaction regions 55 and may be integrally connected through the connection units 73, and the connection units 73 may be integrally bonded to the barrier ribs 20. Therefore, the number of processes for stacking the micropore bodies 60 on the fuel cell 100 of a single cell may be reduced to one. As a result, the time required to stack the fuel cells 100 in order to fabricate a fuel cell stack may be reduced to a level of about 25% of the comparative example.

In an exemplary embodiment, the micropore body 60 may have a plurality of the porous units 71 integrally coupled through the connection units 73, and the connection units 73 themselves function as beads. In other words, stiffness of the micropore body 60 may be increased and when the micropore body 60 may be transferred to form a fuel cell stack, stacking precision of the fuel cell stack may be improved since the micropore body 60 may be prevented from being bent. In an exemplary embodiment, since the flat surface 75 may be formed in the connection unit 73 to which the porous units 61 of the micropore body 60 may be integrally coupled, the connection unit 73 may be used as a bonding area where the separation plate 50 and the micropore body 60 may be bonded. Accordingly, a fuel cell stack may be configured more compactly.

Conversely, in the comparative example, in order to seat the micropore bodies 7 separated from each other to prevent the micropore bodies 7 from interfering with the barrier ribs 3, the micropore bodies 7 are installed in the respective reaction regions 6 with a margin between the micropore body 7 and the bather rib 3. However, the space between the micropore body 7 and the barrier rib 3 has a minimal difference in pressure compared to the flow channel of the micropore body 7. Accordingly, the space may be problematic because a flow of a reaction gas to be inclined and deteriorates the utilization of the reaction gas. Further, in the comparative example, a stacking margin of a specific interval or greater must be secured to seat the micropore bodies 7 in the reaction regions 6 between the barrier ribs 3.

In addition, the separation plate 5 and the micropore body 7 are made of a thin metal plate of about 0.1 t or less. The flatness maybe difficult to be secure, and a stacking margin between the barrier rib 3 and the micropore body 7 may be about 2 mm or greater. Accordingly, in the comparative example, assuming that the number of barrier ribs 3 is 3, when four micropore bodies 7 separated from each other are to be installed in the reaction regions 6 between the barrier ribs 3, there is a total area of about 8 mm or more to which a micropore body has not been applied since a marginal space of about 2 mm or more must be secured for each micropore body 7. As a result, in the comparative example, a phenomenon in which a flow of a reaction gas is inclined in the area to which a micropore body has not been applied, the marginal space of the barrier rib 3 and the micropore body 7. This may lead to a reduction in the utilization of a reaction gas.

In contrast, in an exemplary embodiment, the porous units 71 corresponding to the respective reaction regions 55 may be integrally coupled through the connection units 73, and the connection units 73 may be integrally bonded to the barrier ribs 20, thereby forming the micropore body 60. A stacking margin area between the porous unit 71 and barrier rib 20 of the micropore body 60 may be reduced to about 25% or less compared to the comparative example. Additionally, improvement of performance of a fuel cell according to an increase in the utilization of a reaction gas may be observed.

Figure 6:
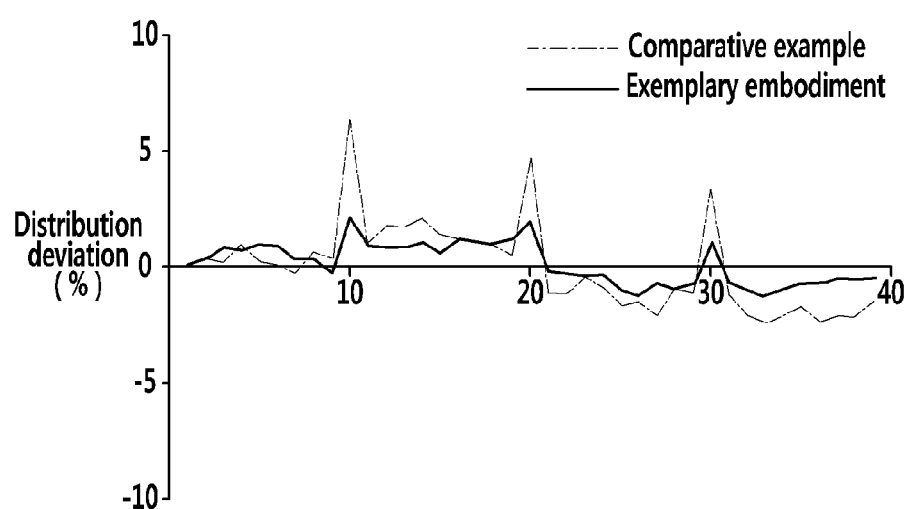
FIG. 6 is an exemplary embodiment of a graph illustrating an analysis of a flow within the separation plate according to an exemplary embodiment of the present invention and an analysis of a flow within the separation plate according to a comparative example.

FIG. 6 is an exemplary embodiment of a graph illustrating an analysis of a flow within the separation plate according to an exemplary embodiment of the present invention and an analysis of a flow within the separation plate according to the comparative example. From FIG. 6, it may be seen that a reaction gas may be distributed at a sustainably constant level in the micropore body 7, and the flow rate of the reaction gas may rapidly increase in the portion of the barrier ribs 3 since the micropore bodies 7 may be installed in the respective reaction regions 6 with a margin between the micropore body 7 and the barrier rib 3 in the comparative example. The reason for this is a flow of the reaction gas is inclined toward the empty space between the micropore body 7 and the barrier rib 3. Accordingly, in the comparative example, the utilization of a reaction gas may be reduced.

Conversely, in an exemplary embodiment, a space between the porous unit 71 and the barrier rib 20 may be minimized since the porous units 71 corresponding to the reaction regions of the separation plate 50 may be integrally coupled through the connection units 73, and the connection units 73 may be bonded to the barrier ribs 20. Accordingly, from FIG. 6, a rapid inclination of a flow of a reaction gas may not be generated in the portion of the barrier rib 20 and the reaction gas may have a uniform distribution deviation.

Figure 7:
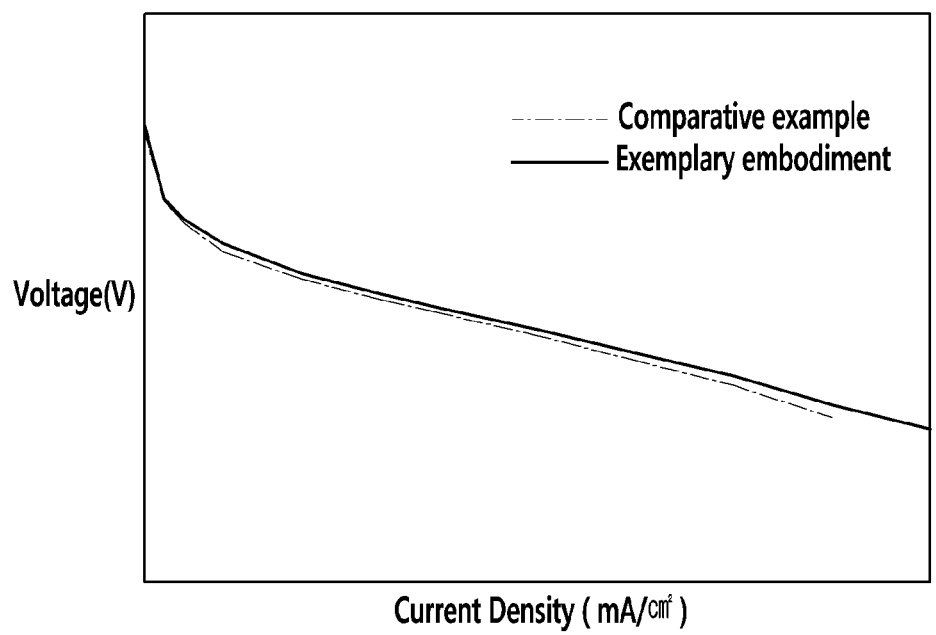
FIG. 7 is an exemplary embodiment of a graph illustrating performance evaluation of the fuel cell according to an exemplary embodiment of the present invention and evaluation of the fuel cell according to a comparative example.

FIG. 7 is an exemplary embodiment of a graph illustrating performance evaluation of the fuel cell according to an exemplary embodiment of the present invention and evaluation of the fuel cell according to the comparative example. In the comparative example, as described above, the utilization of a reaction gas may be reduced because a flow of the reaction gas may be inclined toward the empty space between the micropore body 7 and the barrier rib 3. In an exemplary embodiment, since the space between the porous unit 71 and the barrier rib 20 may be minimized, a reaction gas may be uniformly distributed since a rapid inclination of a flow of the reaction gas may not be generated in the portion of the barrier rib 20. Accordingly, in an exemplary embodiment, as in the performance evaluation results of the fuel cell illustrated in FIG. 7, an improvement in performance of about 1% or more in a high current section compared to the comparative example occurs.

While this invention has been described in connection with what is presently considered to be exemplary embodiments, on the contrary, is intended to cover various modifications and equivalent arrangements included within the spirit and scope of the appended claims. In addition, it is to be considered that all of these modifications and alterations fall within the scope of the present invention.

DESCRIPTION OF SYMBOLS

10 . . . membrane-electrode assembly
20 . . . bather rib
21 . . . groove
30 . . . gas diffusion layer
40 . . . channel unit
41 . . . channel
43 . . . rib
45 . . . channel group
50 . . . separation plate
51 . . . inlet manifold
52 . . . exit manifold
53 . . . reaction surface
55 . . . reaction region
60 . . . micropore body
61 . . . micro aperture
63 . . . flow channel
71 . . . porous unit
73 . . . connection unit
75 . . . flat surface
80 . . . cooling path

What is claimed is:

1. A fuel cell comprising a membrane-electrode assembly and separation plates disposed on both sides of the membrane-electrode assembly, the fuel cell comprising:
    barrier ribs formed in reaction surfaces of the separation plates that correspond to the membrane-electrode assembly and configured to partition the reaction surfaces into a plurality of reaction regions; and
    a micropore body formed of a metal thin plate and disposed between the separation plate and the membrane-electrode assembly, wherein the micropore body includes porous units disposed in the reaction region and a non-porous connection unit formed as a flat surface coupled to the porous units and configured to flatly come in contact with the barrier ribs so as to partition the micropore body into a plurality of regions corresponding to the plurality of reaction regions.

2. The fuel cell of claim 1, wherein the micropore body and the separation plates are coupled together.

3. The fuel cell of claim 1, wherein the connection unit is coupled to the barrier rib by laser bonding.

4. The fuel cell of claim 1, wherein the micropore body is provided as a molding porous body including a plurality of fine apertures and a flow channel.

5. The fuel cell of claim 1, wherein the barrier rib is formed as a groove in a surface opposite the reaction surface and protrudes into the reaction surface.

6. The fuel cell of claim 5, wherein the groove is formed as a cooling path through which a coolant flows.

7. The fuel cell of claim 1, wherein the separation plate includes:
   inlet and exit manifolds through which the reaction gas is introduced and discharged; and
   a channel unit connected to the inlet manifold and the exit manifold and configured to induce the reaction gas to the reaction regions.

8. The fuel cell of claim 7, wherein the channel unit includes channels extended from the inlet manifold and the exit manifold to the reaction regions.

9. The fuel cell of claim 8, wherein the channels have lengths gradually increased from a first side of the inlet manifold and the exit manifold to a second side, and are connected to the reaction regions.

10. The fuel cell of claim 8, wherein the channel unit includes ribs formed between the channels.

11. The fuel cell of claim 10, wherein the barrier rib is coupled to the rib and partitions the reaction surface of the separation plate into a plurality of reaction regions.

12. The fuel cell of claim 11, wherein the barrier rib partitions the channels into a plurality of channel groups coupled to the reaction regions.

13. A plurality of separation plates for a fuel cell disposed on each of both sides of a membrane-electrode assembly and configured to supply a reaction gas to the membrane-electrode assembly, each separation plate comprising:
   barrier ribs formed in reaction surfaces of the separation plates that correspond to the membrane-electrode assembly and to partition the reaction surfaces into a plurality of reaction regions;
   inlet and exit manifolds that have the reaction gas introduced and discharged and to induce the reaction gas to the reaction regions; and
   a micropore body formed of a metal thin plate integrally coupled to the barrier ribs and having the reaction gas and generated water flow in the reaction regions,
   wherein the micropore body includes porous units disposed in the reaction region and a non-porous connection unit formed as a flat surface coupled to the porous units and configured to flatly come in contact with the barrier ribs.

14. The separation plate of claim 13, wherein the micropore body is formed of a metal thin plate and provided as a molded porous body having fine apertures and a flow channel, and the connection unit is integrally bonded to the barrier rib through laser bonding.

15. The separation plate of claim 13, wherein the channel unit includes channels extended from the inlet manifold and the exit manifold to the reaction regions, and the channels have lengths increasing from a first side of the inlet manifold and the exit manifold to a second side and are connected to the reaction regions.

16. The separation plate of claim 15, wherein ribs protrude between the channels, and the barrier rib is coupled to the rib and partitions the reaction surface into a plurality of reaction regions.

17. The separation plate of claim 15, wherein the barrier rib partitions the channels into a plurality of channel groups coupled to the reaction regions.

18. The separation plate of claim 13, wherein the barrier rib is formed as a groove in a surface opposite the reaction surface and protruded into the reaction surface, and the groove is formed as a cooling path through which a coolant flows.

19. The separation plate of claim 13, wherein the flat surface is coupled to the barrier rib by laser bonding.

* * * * *